Feb. 6, 1962 J. M. NUDING 3,019,780
GAS PURIFYING ARRANGEMENT
Filed Dec. 12, 1957

INVENTOR.
JAMES M. NUDING
BY
*Richard F. Carr*
ATTORNEY

United States Patent Office 3,019,780
Patented Feb. 6, 1962

3,019,780
GAS PURIFYING ARRANGEMENT
James M. Nuding, 20415 Baltar St., Canoga Park, Calif.
Filed Dec. 12, 1957, Ser. No. 702,322
13 Claims. (Cl. 123—119)

This invention provides a means whereby gases may be purified and is particularly adapted for removing constituents which result in the production of smog.

Research in the field of smog control over the past several years, while failing to arrive at a solution to the polluted atmosphere present in many cities, has established that products of combustion processes are perhaps the chief cause of a smog condition. It is known that in the combustion of fuels used industrially and in automobiles the process of burning is incomplete. Hence the exhaust gases contain many unburned molecules which are discharged into the atmosphere. These unburned fractions, when acted upon by sunlight under certain conditions, result in an injurious, irritating, smog-laden atmosphere. When combustion takes place in many thousands of automobiles and industrial establishments, as it does in many cities today, a thick blanket of polluted atmosphere results. Heretofore no successful means for removing the unburned, smog-producing portions of exhaust gases has been discovered.

This invention provides a simple means for removal of unburned portions of exhaust gases by which the gases are rotated in a vortex within a chamber something like a Hilsch tube. An axial opening near the point at which the gases are introduced removes the lighter portions of the gases and discharges them to the atmosphere. These constituents are virtually completely burned and do not result in the production of smog. An opening at the opposite end of the chamber transmits the heavier portions of the exhaust, much of which is unburned and would result in the creation of smog. A restrictor is placed in this outlet to cause the lighter gases to pass through the axial opening. The heavier, unburned portions then are suitably disposed of, preferably by being reconducted to the combustor for further oxidation, or by being consumed in an afterburner.

Accordingly, it is an object of this invention to provide a means for purifying exhaust gases.

Another object of this invention is to purify exhaust gases by a simple, economically constructed arrangement having no moving parts.

A further object of this invention is to provide an exhaust purifying device which increases the efficiency of the unit with which it is associated.

Yet another object of this invention is to provide a means for separating the lighter fractions from the heavier fractions in a mixture of gases.

Figure 1:
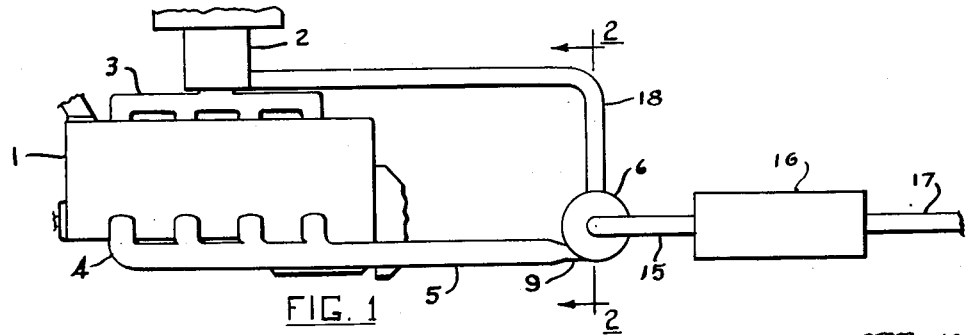
Figure 2:
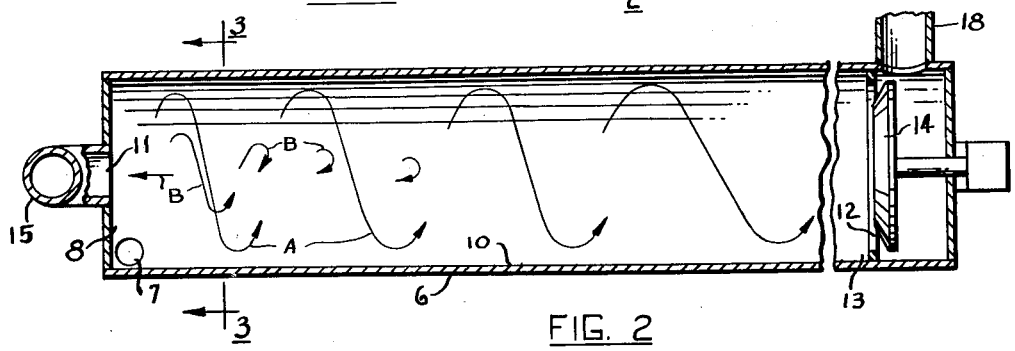
Figure 4:
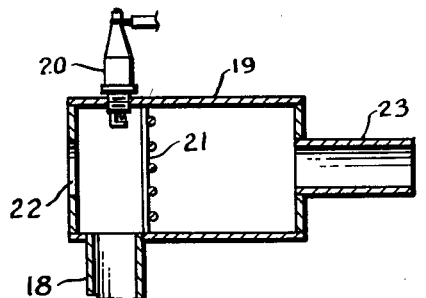
Figure 3:
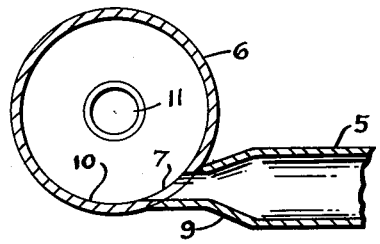
Figure 5:
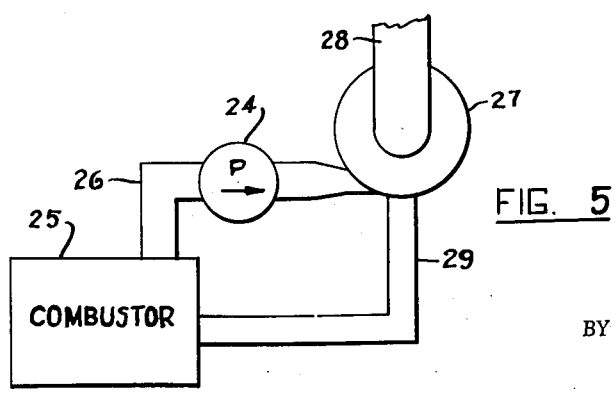

These and other objects will become apparent from the following detailed description taken in connection with the accompanying drawing in which FIG. 1 is a side elevational view of an exhaust gas purifying arrangement for an automobile, FIG. 2 is an enlarged sectional view taken along line 2—2 of FIG. 1, FIG. 3 is a sectional view taken along line 3—3 of FIG. 2, FIG. 4 is a sectional view of an afterburner for disposing of unburned gases in a modified form of the invention, and FIG. 5 is a schematic view of a gas purifying arrangement for an industrial installation.

Referring to FIG. 1, automobile engine 1 is equipped with the usual carburetor 2 supplying a combustible air and gasoline mixture through intake manifold 3 to the cylinders of the engine. The products of combustion from the engine are discharged into exhaust manifold 4 opening into exhaust pipe 5. Instead of conducting the gases immediately to the muffler for discharge into the atmosphere as in the conventional system, exhaust pipe 5 leads to a chamber 6.

As best seen in FIGS. 2 and 3, chamber 6 preferably is constructed as an elongated tubular member having a substantially circular cross section. Exhaust pipe 5 connects at 7 to the chamber at end portion 8 thereof. The exhaust pipe may include a nozzle 9 to accelerate the flow of gases at the point of discharge into the chamber. The nozzle is arranged to direct the gases substantially tangentially to the inner wall 10 of the chamber.

Two outlets are provided for chamber 6, one outlet 11 being at end 8 at the axis of the chamber. This outlet is smaller in diameter than the interior of the chamber. The other outlet 12 is located at opposite end 13 of the chamber and is provided with a restrictor 14. It is desirable to locate outlet 12 some distance from inlet 7, a length equal to fifty times the radius of chamber 6 having been found satisfactory.

By this construction, when gases from exhaust pipe 5 are discharged along inner wall 10 of the chamber a rapid, swirling flow is produced. The rotating gases flow through the chamber toward outlet 12, being maintained at the wall of the chamber at the point of introduction and thus prevented from entering the relatively small opening 11. As the vortex-like flow continues the heavier portions of the exhaust gases are held along inner chamber wall 10 by centrifugal force. The lighter fractions, on the other hand, are forced toward the center of the chamber by the heavier components, becoming concentrated along the axis of the chamber which is the axis of rotation of the gases. At end 13, where the rotational velocity of the gases has decreased due to internal friction, restrictor 14 throttles the flow through opening 12 preventing the lighter, axially disposed gases from discharging through that outlet. As a result, only the heavier portions of the exhaust gases leave chamber 6 via outlet 12, while the lighter fractions are caused to discharge through axial opening 11. The general flow pattern may be seen in FIG. 2 where arrows A represent the heavier molecules of the exhaust gases, while arrows B depict the path of the lighter components.

The separation of the lighter and heavier portions of the exhaust effectively divides the components which will produce smog from those which are harmless. The lighter fractions are virtually completely oxidized and are incapable of producing smog when they enter the atmosphere. Consequently, outlet 11 opens into discharge pipe 15 which directs the lighter gases through conventional muffler 16 and tailpipe 17 to the atmosphere.

The heavier and largely unburned gases, on the other hand, are returned to the engine intake manifold 3 by means of pipe 18. Thus the unburned gases re-enter the cylinders and there become consumed and transformed into oxidized and harmless products. This not only purifies the exhaust gases of the engine, but also results in more complete combustion of the fuel and increases the efficiency of the engine. Therefore the dual advantages of smog elimination and decreased fuel consumption are obtained.

The restrictor for outlet 12 may take a variety of forms and may be either fixed or adjustable to control the amount of restriction it affords. The composition of an engine's exhaust is not the same for all operating conditions, and is not identical under similar conditions for different engines. Adjustment of the axial position of restrictor 14, therefore, may be resorted to in obtaining the most effective purifying arrangement. If desired, this adjustment may be made automatic by connection, for example, to the engine intake system where the vacuum varies with changes in engine load.

As an alternative to returning the heavier exhaust gases to the engine intake the arrangement of FIG. 4 may be used. This embodiment has the advantage of requiring no modification of the intake system of an existing engine. Here an afterburner 19 is provided in line 18 to receive and burn the heavier gases. This unit may include a spark plug 20 for igniting the gases, a flameholder 21 in the form of a grid of rods or wires, and an inlet 22 for admitting additional air to obtain a combustible mixture. The fully oxidized, harmless gases then leave the afterburner through outlet 23 where they enter the atmosphere.

FIG. 5 illustrates schematically the application of the invention to an industrial system. Here the arrangement is basically the same as previously described, but a pump 24 has been added to increase the velocity of the gases so that greater rotational speed may be obtained and more effective separation of the gas components will result. Thus combustor 25 discharges exhaust gases into stack 26 where blower 24 increases their velocity as they are conducted into chamber 27 which is similar to chamber 6. The fully oxidized gases leave chamber 27 by stack 28 which connects to the chamber at the axis of rotation of the gases. Return line 29 conducts the heavier components back to the combustor for complete oxidation. The use of a blower also is feasible for automotive installations for increasing the gas velocity and decreasing engine back pressure.

It is obvious that the invention need not have the exact configuration shown and described. The critical factors, however, are producing a rotation of the gases to separate the lighter and heavier components while removing the lighter components near the axis of rotation. The heavier fractions are removed at a different location and then suitably disposed of. In this manner it is possible to purify gases from a combustor by a simple system which need have no moving parts. In addition it is apparent that use of this invention is not restricted to exhaust systems, but may be applied also to any problem of separating lighter and heavier components of any gas mixture.

The foregoing detailed description of the invention is given solely for illustration, the spirit and scope of this invention being limited only by the following claims.

I claim:

1. A gas purifying arrangement comprising a source of incompletely oxidized gases, an open substantially cylindrical chamber, means for introducing said gases into said chamber in a rotational flow pattern, outlet means for said chamber defining an exit aperture in said open chamber adjacent said means for introducing said gases at the axis of rotation of said gases for removing lighter components of said gases, a restricted outlet for said chamber for removing heavier components of said gases, and means connected to said restricted outlet for oxidizing said heavier components of said gases.

2. A device for producing fully burned gases comprising means for producing a mixture of burned and unburned gases, an open substantially cylindrical chamber, means for introducing said gases into said chamber in a rotating path of movement, outlet means remote from said introducing means for removing unburned portions of said gases and burning the same, restrictor means in said outlet means, and an additional outlet means having an opening adjacent said introducing means, said opening providing an exit aperture in said open chamber at the axis of rotation of said gases for removing burned portions of said gases from said chamber.

3. A device for purifying gases which contain relatively light burned components and relatively heavy unburned components comprising an open elongated substantially cylindrical chamber, inlet means at one end of said chamber for receiving such gases and discharging the same into said chamber in a rotational flow pattern, a restricted outlet for said chamber at the opposite end thereof for removing the heavier components of said gases, means connected to said restricted outlet for burning said heavier components, and an additional outlet means providing an exit aperture in said open chamber at said one end at the axis of said chamber for removing lighter components of said gases.

4. A device for purifying an exhaust gas mixture comprising a relatively long open substantially cylindrical chamber, an inlet nozzle at one end of said chamber for receiving such exhaust gases, said nozzle being constructed to discharge circumferentially and substantially tangentially to the inner wall of said chamber at said one end thereof, thereby to produce a rotational flow pattern for gases discharged into said chamber, an axially disposed outlet for said chamber at said one end, said outlet being smaller in diameter than the diameter of the interior of said tubular member, a second outlet for said chamber at the opposite end thereof, said second outlet having restrictor means therein, and means connected to said second outlet for burning gases transmitted therethrough.

5. In an internal combustion engine having inlet manifold means and exhaust means, an exhaust gas purifying arrangement comprising an open substantially cylindrical chamber, means interconnecting said exhaust means and said chamber for introducing the entire quantity of the exhaust gases in said exhaust means into said chamber in a rotating flow pattern, an outlet for said chamber at the axis thereof opening to the atmosphere for removing lighter fractions of said gases, restricted outlet means for said chamber for removing heavier fractions of said gases, and means interconnecting said restricted outlet means and said inlet manifold means for returning said heavier fractions to said engine.

6. A device as recited in claim 1, in which said means for introducing said gases into said chamber includes a means for accelerating the flow of said gases for increasing the velocity of rotation of said gases.

7. A device as recited in claim 6 in which said accelerating means comprises a convergent nozzle.

8. A device for separating relatively light fractions from relatively heavy fractions of a gas mixture comprising a hollow cylindrical chamber having an end wall, a circumferential wall and an open interior, an inlet for said chamber adjacent the circumferential wall of said chamber adjacent said end wall thereof for discharging said gases tangentially into said chamber along said circumferential wall in a rotational pattern, a first outlet for said chamber at the opposite end thereof for exhausting relatively heavier fractions of said gases, a restrictor in said first outlet, and a second outlet for said chamber in said one end wall thereof at the axis of said chamber.

9. A device as recited in claim 8 in which the axial length of said chamber is approximately fifty times the radius of said chamber.

10. A device for separating relatively light burned components from relatively heavy unburned components of the exhaust gas of an internal combustion engine in a smog eliminating system, said device comprising an elongated open substantially cylindrical chamber, inlet means at one end of said chamber adapted for connection in series to the exhaust system of an internal combustion engine, said inlet means including an opening means adjacent the circumferential wall of said chamber for discharging gases tangentially into said chamber along said wall in a rotational pattern, a first outlet means for said chamber having an opening communicating with said chamber substantially at the axis thereof at said one end of said chamber, said first outlet means being adapted for discharge into the atmosphere, and a second outlet means for said chamber having a restricted opening communicating with said chamber at the opposite end thereof for removing heavier unburned components of gases received in said chamber, said second outlet means being adapted for connection to a means for oxidizing said unburned components of such gases.

11. A device for separating relatively light burned components from relatively heavy unburned components of the exhaust gas of an internal combustion engine comprising an open substantially cylindrical chamber, inlet means at one end of said chamber connectable to the exhaust pipe of an internal combustion engine for receiving the entire contents thereof and discharging such gases into said chamber in a rotational flow pattern, a first outlet means communicating with said chamber at said one end thereof for discharging relatively light burned components of gases in said chamber, and a second restricted outlet means for said chamber at the opposite end thereof for discharging heavier unburned components of such gases.

12. A device as recited in claim 11 in which said means for introducing said gases into said chamber includes a means for accelerating the flow of said gases for increasing the velocity of rotation thereof.

13. A device as recited in claim 12 in which said accelerating means comprises a convergent nozzle.

References Cited in the file of this patent

UNITED STATES PATENTS

| | | |
|---|---|---|
| 1,278,334 | Grieve | Sept. 10, 1918 |
| 2,147,671 | Pratt | Feb. 21, 1939 |
| 2,349,675 | Pratt | May 23, 1944 |
| 2,349,676 | Pratt | May 23, 1944 |
| 2,773,558 | Arborgh | Dec. 11, 1956 |
| 2,785,055 | Redcay | Mar. 12, 1957 |
| 2,786,547 | McCartney | Mar. 26, 1957 |
| 2,860,618 | Mansfield | Nov. 18, 1958 |